June 19, 1951      A. RAZDOWITZ      2,557,140
ROTARY JOINT
Filed Dec. 23, 1948      2 Sheets-Sheet 1
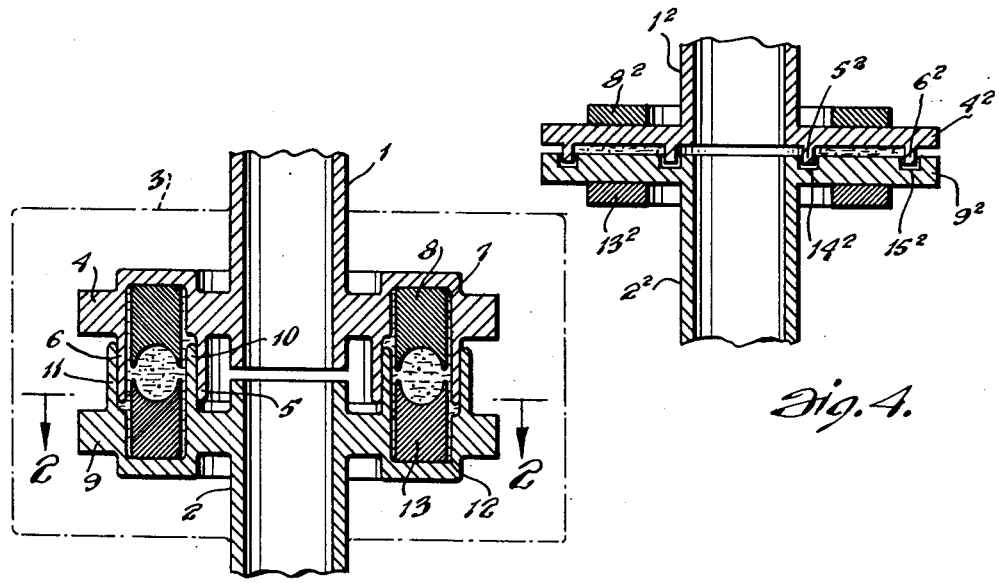
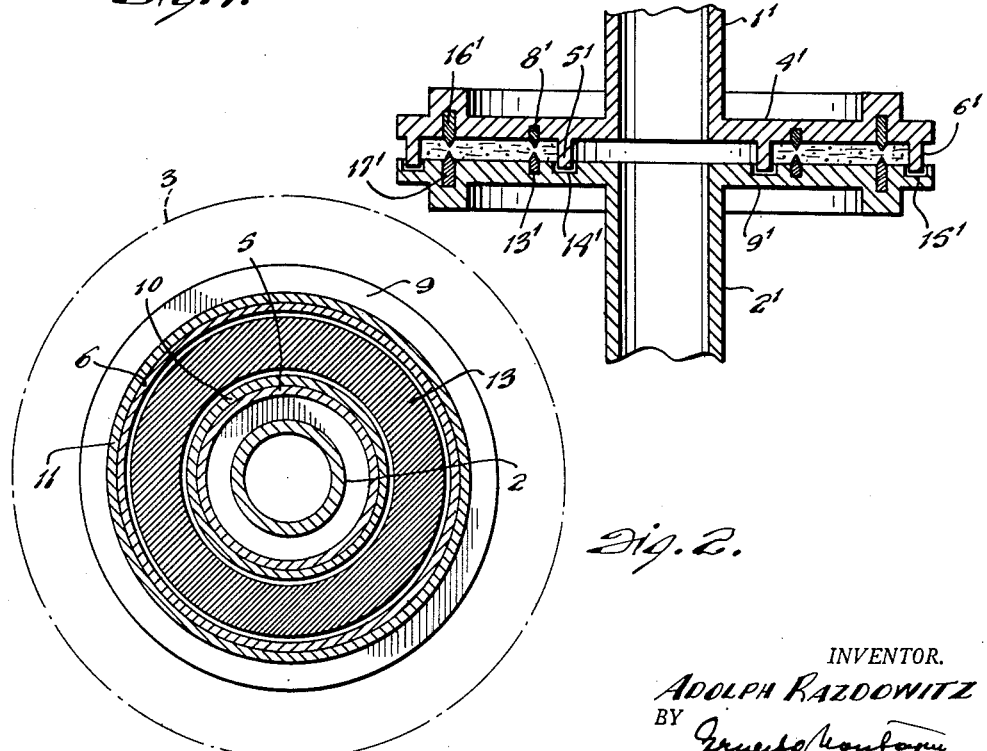
INVENTOR.
ADOLPH RAZDOWITZ
BY June 19, 1951 A. RAZDOWITZ 2,557,140
ROTARY JOINT
Filed Dec. 23, 1948 2 Sheets-Sheet 2
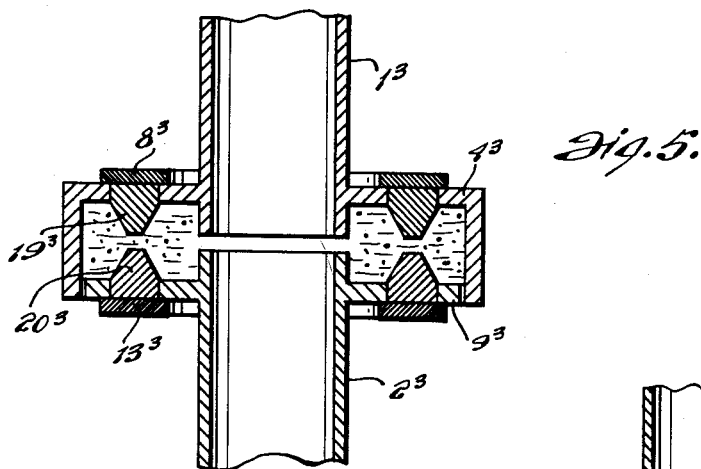
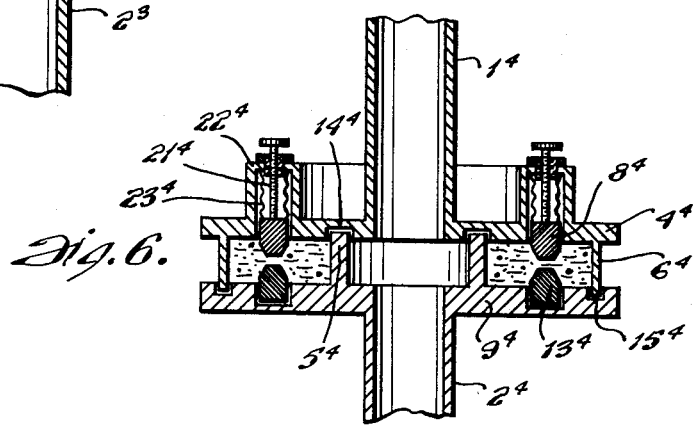
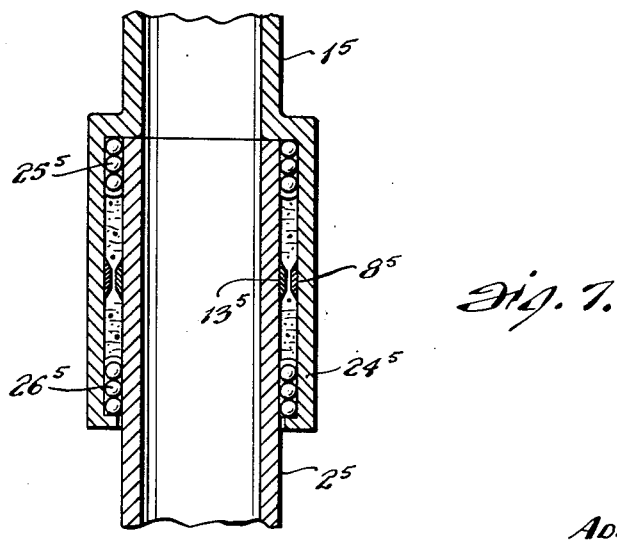
INVENTOR.
ADOLPH RAZDOWITZ
BY Patented June 19, 1951

2,557,140

UNITED STATES PATENT OFFICE 2,557,140

ROTARY JOINT

Adolph Razdowitz, New York, N. Y.

Application December 23, 1948, Serial No. 66,910

12 Claims. (Cl. 285—109)

The present invention relates to rotary joints in general and to rotary joints of pressurized members as used for radar equipment in particular.

Such rotary joints used in connection with pressurized equipment, where one member is supposed to rotate relative to the other, brought about a difficult problem namely that of sealing the joint particularly since rotary joints in many fields as in radar equipment have to be tight for relatively high fluid pressure and have to have a very low frictional torque.

Proposals have been made heretofore for sealing means on rotary joints, among them rubber gaskets and lapped joints.

The former proved to be not satisfactory, since it was impossible to find an organic material capable to withstand the extreme changes in temperature. It has been found that collapsing of the actual seals takes place.

The latter, likewise proved to be inoperative for practical purposes because the use of two lapped surfaces riding in an oil film, which acts as a lubricant, and sealed by a spring tension device at either end of two tubes to be jointed results in extreme end play and wobble after a relatively short time of operation. By the virtue of this same condition side leakage occurs and thereby permits a condition which is useless to any type of rotating operation. The condition which occurs due to the side leakage will result in a metal to metal bearing surface of two highly lapped parts and results in striction, non-lubrication, wobbles, jumps and extreme wear resulting in high spots on the bearing surface. By the use of this device balancing of the load to be carried is difficult and as a result under the axial and radial load wobbling and striction become prevalent. If, however, high spring pressure is utilized, a leakage free system demands high torque.

Thus it is apparent that the rotation of one pressurized member relative to the other is rather difficult, if at the same time satisfactory sealing between the members is maintained.

The present problem of sealing of rotary joints becomes particularly important, when rigid coaxial lines are used in air-borne equipment, providing the possibility of decreasing the dielectric strength of the air by the reduction of atmospheric pressure at high altitudes, so that the line is ligely to arc over. In addition, the sudden changes in temperature and pressure to which air-borne equipment is subjected frequently result in condensation of moisture inside the line, increasing both the dielectric loss and the likelihood of breakdown of the insulation. To avoid these drawbacks the R.-F. lines of air-borne equipment are sealed and filled with dried air, nitrogen or other convenient fluid as pressure above atmosphere and the antenna and the modulator may be pressurized as well as the coaxial lines. The occurrence of leakage is found dangerous because of a possible breakdown of insulation in the waveguides. But even intermittent leakage in the joint produces modulation of high frequency current due to the change of the conductivity with the change of the fluid pressure. Thus the rotary joints turn out to be often the most critical parts of a transmission line and of antenna mounts in particular.

It is, therefore, the main object of the present invention to provide a system having a seal-tight rotary joint between two pressurized elements.

It is another object of the present invention to provide a chamber between the two elements to be jointed, said chamber to be filled with a liquid or jelled composition comprising iron particles in an open magnetic field and stabilized by fluid pressure.

It is still another object of the present invention to provide a magnetic fluid seal for two members to be jointed for rotary movement.

It is a further object of the present invention to provide a magnetic fluid seal for rotary joints the value of static friction of which does not differ appreciably from the value of kinetic friction.

It is yet another object of the present invention to provide a magnetic fluid seal for rotary joints in which no discontinuation in torque exists at the instant of initiation of slip.

It is still another object of the present invention to provide a rotary joint for pressurized elements which permits of the use of small servo controlled motors.

With these and other objects in mind which will become apparent in the following detailed specification, the present invention will be clearly understood in connection with the accompanying drawings, in which:

Figure 1 is a sectional elevation of one embodiment of a rotary joint;

Fig. 2 is a section along the lines 2—2 of Fig. 1;

Fig. 3 is a sectional elevation of another embodiment of a rotary joint with two radially displaced magnet systems;

Fig. 4 is a sectional elevation of a third embodiment with outside magnet arrangement;

Fig. 5 is a sectional elevation of another embodiment of a rotary joint with outside magnet arrangement;

Fig. 6 is a sectional elevation of an embodiment of a rotary joint with adjustable length of the magnetic field; and Fig. 7 is a sectional elevation of an embodiment of a rotary joint with radial magnet arrangement.

Referring now to the drawings and at first particularly to Figs. 1 and 2, the present device comprises two tubular bodies 1 and 2, which may be coaxial cables or waveguides or a combination of both, the upper body 1 and the lower body 2 to be supported by a suitable frame 3 in such manner that one of the bodies may rotate relative to the other by any suitable driving means as a servo-motor (not shown). The body 1 is equipped with a ring shaped plate 4 having two radially spaced extensions 5 and 6 which are disposed in axial downward direction and which together with a recess 7 in the plate 4 form a housing for a ring shaped magnet 8. While a permanent magnet is shown, it is to be understood that an electro-magnet may be used.

The body 2 has a similar ring shaped plate 9 being equipped with two radially spaced extensions 10 and 11 which are disposed in axial upward direction adjacent the extensions 5 and 6 and which also together with a recess 12 form a housing for a corresponding magnet 13 in such position that a magnetic field is formed between the magnets 8 and 13.

The tubular bodies 1 and 2 are provided with suitable means (not shown) for supplying predetermined pressure above atmospheric pressure of air, nitrogen or any other convenient fluid.

The housing for the magnets 8 and 13 form a single chamber which contains iron particles suspended in a liquid or jelled composition preferably oil, silicone or any other suitable liquid. Silicon liquids bring about good results, enabling the seal to operate at very low and very high temperatures.

The tension exorted on the force obtained by the suspended particles in the magnetic field will not permit a fluid gap to become travellant. The used composition sustains pressure changes and permits a permanent type of sealing without the possibility of a metal to metal condition or a fluid gap thus unsealing the joint.

An unexpected, yet desirable feature, found at least in some forms of the magnetic fluid seal is that the value of static friction does not differ appreciably from the value of kinetic friction; hence no discontinuities in torque exist at the instant of initiation of slip. It is a very important feature of the present invention that the pressure between the tubular members is much smaller than in ordinary rotary joints, thus permitting the conditions for mechanical relaxation to be eliminated and the use of small servo controlled motors.

It is well known that for slow speed as required for rotary radar equipment the presence of mechanical relaxation oscillation is very disagreeable. Mechanical relaxation oscillations are possible in a system where the friction force is a function of the velocity. If the speed of the shaft is relatively small, the velocity torque characteristic goes down and represents in this case a "negative resistance." At this point the discontinuity occurs at a constant potential energy. The unit jumps and comes back to the initial point. Hence again the characteristic is negative. Thus in this case relaxation oscillations are possible if the phenomenon is confined to an unstable region of the characteristic. Specifically low speed movement relaxation oscillations are possible. In order to obtain a "smooth" movement an infinite number of small "jumps" must be utilized. Large "jumps" may appear with a low constant speed and under certain conditions will modulate the radar beam and be visible on the cathode ray tube, when applied to radar equipment.

When the space between two parallel magnetic surfaces is filled with finely divided magnetic particles and a magnetic field is established, the magnetic particles may form a pressure resistant bridge in form of a cylinder between the magnets. If the surface is small the relative friction is small but the mechanical strength perpendicular to the movement is important. If there is any pressure perpendicular to the movement of the plates, as in the pressurized equipment, then the resultant movement will produce a hyperbolic line of the mixture. The oil, which prevents packing of the particles, induces smooth operation. When a portion of this mixture is acted on by a magnetic field, the iron particles are mutually attracted, bind together in the field, and the mixture "solidifies."

Since slipping occurs between extremely fine iron particles and between the iron particles and smooth face surfaces of the seal and surfaces which are lubricated, the wear factor is extremely low. In addition the worn iron particles remain in the mixture and thus do not present any loss.

The embodiment shown in Fig. 3 operates on the same principle as that described in connection with Fig. 1 and comprises an upper body 1' and a lower body 2', each having also a ring shaped plate 4' and 9', respectively. The upper plate 1' has extensions 5' and 6' which reach into recesses 14' and 15', respectively, of the lower plate 9'. Instead of inserting one magnet in each of the plates, however, two magnets 8', 13' and 16', 17' are provided in radially displaced arrangement which form two separate magnetic fields in the housing which contains the mixture of a fluid and iron particles.

The embodiment shown in Fig. 4 has also an upper tubular body $1^2$ and a lower tubular body $2^2$, both bodies having plates $4^2$ and $9^2$, respectively, and a housing for the mixture of a fluid and iron particles is formed by extensions $5^2$ and $6^2$ of the upper plate reaching into respective recesses $14^2$ and $15^2$ of the lower plate. The magnet $8^2$, $13^2$ is arranged adjacent the outer faces of the plates $4^2$ and $9^2$ and forms its magnetic field through the plates. While this construction operates quite satisfactory in some applications, the magnetic field appears to be weak in others.

Fig. 5 shows an arrangement similar to that of Fig. 4, by providing an upper tubular body $1^3$ and a lower tubular body $2^3$. The plate $4^3$ of the upper body $1^3$ terminates into a downward extending cylindrical portion $18^3$ which overlaps the plate $9^3$ of the lower body $2^3$. Thus a housing of greater height is achieved between the plates which has tapered ring members $19^3$ and $20^3$ made of soft iron or other magnetizing material attached to the magnet $8^3$, $13^3$, and penetrating the respective plates, the magnets $8^3$, $13^3$ being disposed adjacent their outer faces.

Fig 6 discloses an embodiment which permits of changing the distance between the magnets and, thereby, of adjusting the magnetic field. An upper tubular body $1^4$ and a lower tubular body $2^4$ is provided and said bodies have plates $4^4$ and $9^4$, respectively. The upper plate $4^4$ is equipped with an extension $5^4$ which is received by a recess $14^4$ of the lower plate $9^4$ and the latter is equipped with an extension $6^4$ which is received by a recess $15^4$ of the upper plate $4^4$. Thus a housing is formed for the mixture of a fluid and iron particles and also a seat is provided for the magnets $8^4$, $13^4$. The upper magnet $8^4$ is secured to a plurality of screw bolts $21^4$ each of which turns in the base of a cylindrical member $22^4$ carrying counter-thread and thus permitting lifting or lowering of the upper magnet $8^4$. The magnet $8^4$ carries a cylindrical bellow $23^4$ which is connected by means of soldering or the like to the inner face of the member $22^4$.

The embodiment shown in Fig. 7 discloses an upper tubular body $1^5$ and a lower tubular body $2^5$. The upper body $1^5$ has at its lower end a cylindrical extension $24^5$ of slightly larger diameter, the lower end of which is bent inwards in radial direction towards the outer face of the lower body $2^5$. Thus a chamber for the mixture of a fluid and iron particles is formed which surrounds the lower body $2^5$. The upper and lower end of the chamber receives ball bearings $25^5$ and $26^5$, which serve to take up radial and axial thrust. The magnets $8^5$, $13^5$ are secured to the inner face of the cylindrical extension $24^5$ and the outer face of the lower body $2^5$ and may be shaped in such manner that one or more magnetic fields are formed which extend in radial direction. It is possible, however, to provide more than one magnet set.

While I have disclosed several embodiments of the present invention, it is to be understood that these embodiments are given by example only and not in a limiting sense, the scope of the invention to be determined by the objects and the claims.

I claim:

1. In a rotary joint for pressurized elements, two hollow members, to be jointed for rotary movement, means for applying predetermined pressure within said members, a chamber disposed between said members and adapted to receive a magnetizable fluid, means for providing a magnetic field in said chamber in order to solidify said magnetizable fluid in the field, thereby providing sealing means against pressure leakage for said members.

2. In a rotary joint for pressurized elements, two hollow members to be jointed for rotary movement, means for applying predetermined pressure within said members, a chamber disposed between said members and adapted to receive a magnetizable fluid, magnets disposed within said chamber and secured to said respective members, said magnets being adapted to provide a magnetizable field in said chamber in order to solidify said magnetic fluid in the field, thereby providing sealing means against pressure leakage for said members.

3. The rotary joint, as set forth in claim 2, which includes means for adjusting the space between the magnets in order to control the magnetic field in said chamber.

4. In a rotary joint for pressurized elements, two hollow members, means for applying predetermined pressure within said members, a chamber disposed between said members and adapted to receive a magnetizable fluid, magnets disposed outside of said chamber and secured to said respective members, said magnets being adapted to provide a magnetic field in said chamber to solidify said magnetizable fluid in the field, thereby providing sealing means against pressure leakage for said members.

5. The rotary joint for pressurized elements, as set forth in claim 4, which includes ring members of soft iron material within said member and attached to said magnets in order to increase the field energy between said ring members.

6. In a rotary joint for pressurized elements, two tubular members, means for applying predetermined pressure within said members, a ring shaped plate secured to each of said members, extensions on at least one of said plates directed toward the other plate to form a ring shaped chamber receiving a mixture of fluid and iron particles as well as at least one set of magnets in order to provide at least one magnetic field in said chamber and to solidify the fluid in the magnetic field, thereby providing sealing means against pressure leakage for said members.

7. In a rotary joint for pressurized elements, two tubular members, means for applying predetermined pressure within said members, a ring shaped plate secured to each of said members, extensions on at least one of said plates directed towards the other plate to form a ring shaped chamber receiving a mixture of fluid and iron particles as well as two sets of radially displaced magnets in order to provide two independent magnetic fields and to solidify the fluid in the two magnetic fields, thereby providing sealing means against pressure leakage for said members.

8. In a rotary joint for pressurized elements, two tubular members, means for applying predetermined pressure within said members, a cylindrical extension on one of said members, said extension being of larger diameter than that of the other of said members, and surrounding the other of said members, thereby forming a chamber around said other members, said chamber receiving a mixture of fluid and iron particles, at least one set of magnets secured to the extension and said other member, respectively, in order to provide a magnetic field in said chamber and to solidify the fluid in the magnetic field, thereby providing sealing means against pressure leakage for said members.

9. In a rotary joint for pressurized elements, two tubular members, means for applying predetermined pressure, a ring shaped plate secured to each of said members, extension on at least one of said plates directed towards the other plate to form a ring shaped chamber receiving a mixture of fluid and iron particles as well as at least one set of magnets disposed outside of said plates, and one ring member in said chamber penetrating each plate and contacting the corresponding magnet, in order to provide a magnetic field between the inner ends of said ring members in said chamber and to solidify the fluid in the magnetic field, thereby providing sealing means against pressure leakage for said members.

10. In a rotary joint, at least one pressurized chamber, a member extending into said chamber, means permitting movement of said member relative to said chamber, a compartment disposed between said chamber and said member and adapted to receive a magnetic fluid, means providing a magnetic field in said compartment in order to solidify said magnetic fluid in the field, thereby providing sealing means against pressure leakage upon relative movement of said member, 11. In a sealing device, a first member and a second member, a magnetic field formed between said members, a magnetizable fluid disposed in said magnetic field between said members, said fluid including magnetizable particles to exert a stress of said fluid toward said members and, thereby to provide a seal between said members.

12. In a rotary joint, at least one pressurized chamber, a member extending into said chamber, means permitting movement of said member relative to said chamber, a compartment disposed between said chamber and said member, and adapted to receive a magnetizable fluid selected from the group consisting of oil and silicone, said fluid including iron filings, means providing a magnetic field in said compartment in order to solidify said magnetizable fluid in the field, thereby providing sealing means against pressure leakage upon relative movement of said member.

ADOLPH RAZDOWITZ.

REFERENCES CITED

The following references are of record in the file of this patent:

UNITED STATES PATENTS

| Number | Name | Date |
|--------|------|------|
| 943,267 | Phelps | Dec. 14, 1909 |
| 1,172,836 | Roser | Feb. 22, 1916 |
| 2,417,850 | Winslow | Mar. 25, 1947 |